US005853169A

United States Patent [19]

Hern et al.

[11] Patent Number: 5,853,169

[45] Date of Patent: Dec. 29, 1998

[54] VACUUM POD SUPPORT SYSTEM

[75] Inventors: John F. Hern, Jasper; Kevin T. Smith, Lamar, both of Mo.

[73] Assignee: O'Sullivan Industries, Lamar, Mo.

[21] Appl. No.: 855,743

[22] Filed: May 8, 1997

Related U.S. Application Data

[63] Continuation of Ser. No. 547,621, Oct. 24, 1995, abandoned.

[51] Int. Cl.[6] ........ B23B 31/30

[52] U.S. Cl. ........ 269/21

[58] Field of Search ........ 269/20, 21; 279/3; 294/64.1; 451/388

[56] References Cited

U.S. PATENT DOCUMENTS

| | | | |
|---|---|---|---|
| 2,680,994 | 6/1954 | Wood . | |
| 3,484,093 | 12/1969 | Mermelstein | 269/21 |
| 3,698,423 | 10/1972 | Dahlquist et al. . | |
| 4,491,306 | 1/1985 | Eickhorst | 269/21 |
| 4,723,766 | 2/1988 | Beeding . | |
| 5,110,239 | 5/1992 | Riley et al. . | |
| 5,222,719 | 6/1993 | Effner | 269/21 |
| 5,315,749 | 5/1994 | Nenadic et al. | 269/21 |

*Primary Examiner*—Robert C. Watson
*Attorney, Agent, or Firm*—Haynes and Boone, L.L.P.

[57] ABSTRACT

A vacuum pod system for supporting a workpiece. A work table is provided with a shouldered opening formed therein in communication with a vacuum source. A pod is provided having a first longitudinal portion of a first outside diameter which seats on the shoulder in the opening, and a second longitudinal portion for supporting the workpiece, the second portion having a second outside diameter unequal to the first diameter. A passageway extends through the pod for providing communication between the first and second portions so that when the workpiece is supported on the second portion, a vacuum generated by the vacuum source creates a suction force which secures the workpiece to the pod.

17 Claims, 2 Drawing Sheets

VACUUM POD SUPPORT SYSTEM

This is a continuation, of application Ser. No. 08/547,621, filed Oct. 24, 1995, now abandoned.

TECHNICAL FIELD

The invention relates generally to a system in which vacuum pods are utilized to support workpieces for machining.

BACKGROUND OF THE INVENTION

In a wide variety of machining operations, such as those performed by milling, routing, or drilling machines, it is often desirable and necessary to rigidly support a portion of a workpiece in an elevated fashion above the machine tool bed or work table to allow the tool to penetrate the workpiece without interfering with the work table. Examples are numerous and include those where a workpiece has to be milled along its edges by a milling cutter which moves totally around its periphery, or where holes need to be drilled completely through a workpiece, or where large openings have to be formed by plunging a routing cutter completely through the workpiece and then moving it through a selected closed path. If the workpiece were positioned directly on the work table when performing operations such as these, the tool would inevitably engage the table, damaging the tool, the table, or both. With the workpiece elevated, a safe degree of clearance is provided between the cutting device and the work table even when the cutting device projects completely through the workpiece.

The elevational support of the workpiece is conventionally provided by a plurality of "vacuum" pods seated in a plurality of spaced recessed openings formed in the work table, which openings communicate with a source of vacuum. Each of the pods comprise cylindrically shaped walls which define a hollow passageway extending therethrough. Accordingly, a vacuum generated by the vacuum source is communicated through the passageways and acts on the surface of a workpiece supported on the pods to create a suction force which secures the workpiece thereto.

The strength of the suction force acting on the workpiece is directly proportional to the workpiece surface area that is exposed to the vacuum in the pod passageway. The suction force acting on the workpiece may thus be maximized by sizing the pod passageways, and hence the pods, to be as large as possible. If a pod is sized too large, however, then relatively small workpieces may be unable to cover and seal the exposed passageway, thereby resulting in a vacuum leak and a loss of suction force acting on the workpiece. Therefore, a pod should be large enough to provide sufficient suction force to secure a workpiece thereto, as well as small enough to permit a small workpiece to adequately cover and seal the passageway.

To reconcile the foregoing tension between large and small pods, work table openings are commonly configured to seat two sizes of pods: one relatively large pod and one relatively small pod. As shown in the exploded view of FIG. 1, this is achieved in the prior art by a system 10 comprising a work table 12 having an opening 12*a*, a passageway aperture 12*b*, and a shoulder 12*c* recessed therein for seating a smaller pod 14. An annular groove 12*d* configured for seating a larger pod (not shown, but shaped similarly to the smaller pod 14) is formed in the table 12 and encircles the shouldered opening 12*a*. As a consequence of forming the opening 12*a* and the groove 12*d*, an inner ring 12*e* is formed which protrudes upwardly therebetween. A drawback to the system 12 is that the ring 12*d* is vulnerable to failure (e.g., breakage) when the either the larger pod or the smaller pod 14 is seated in the opening 12*a* or removed therefrom, thereby rendering the opening 12*a* virtually useless for seating the small pod 14. Moreover, the work table 12 requires approximately three times as much time to fabricate as does a work table designed to accommodate just one size of pod.

Therefore, what is needed is a work table and pod system which can accommodate multiple sizes of pods, which may be readily fabricated, and which is not vulnerable to failure.

SUMMARY OF THE INVENTION

The present invention, accordingly, provides a work table and pod system that overcomes or reduces the disadvantages and limitations associated with prior designs.

In accordance with the present invention, a vacuum pod system for supporting a workpiece comprises a work table with a shouldered opening formed therein in communication with a vacuum source. A pod is provided having a first longitudinal portion of a first outside diameter which seats on the shoulder in the opening, and a second longitudinal portion for supporting the workpiece, the second portion having a second outside diameter unequal to the first diameter. A passageway extends through the pod for providing communication between the first and second portions so that when the workpiece is supported on the second portion, a vacuum generated by the vacuum source creates a suction force which secures the workpiece to the pod.

A technical advantage achieved with the present invention is that the work table may be fabricated in one-third the time required to fabricate a conventional work table configured to seat two sizes of pods.

Another technical advantage achieved with the present invention is that it does not result in the formation of a ring which would be vulnerable to failure.

Another technical advantage achieved with the present invention is that it accommodates pods having upper portions of virtually any size.

Another technical advantage achieved with the present invention is that it is compatible with prior art systems.

DETAILED DESCRIPTION OF THE PREFERRED EMBODIMENT

Figure 1:
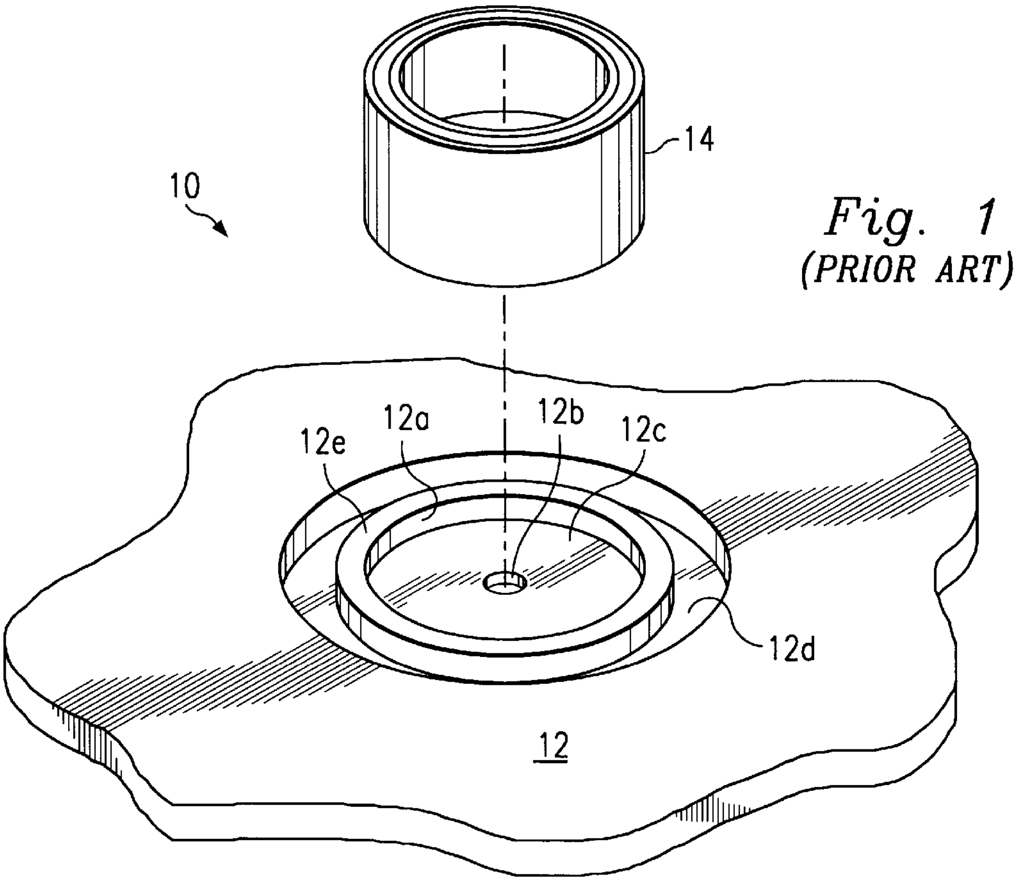
Fig. 1 (PRIOR ART)
FIG. 1 is a perspective, exploded, partially broken-away view of a vacuum pod support system of the prior art.

FIG. 1 illustrates a prior art router pod system, as explained in the Background of the Invention.

Figure 2:
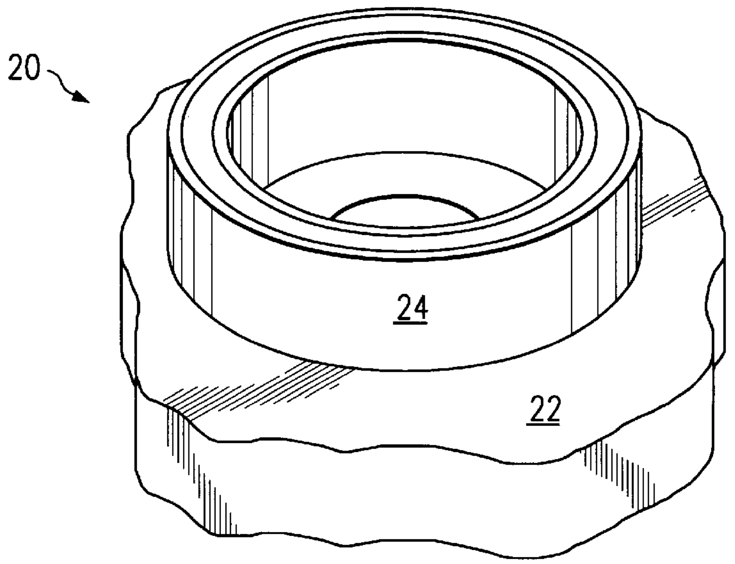
FIG. 2 is a perspective, partially broken-away view of a vacuum pod support system of the present invention.

In FIG. 2, the reference numeral 20 refers to a support system embodying features of the present invention. The system 20 includes a work table 22 and a vacuum pod 24 seated in an opening formed in the table 22, as described below. The work table 22 and the pod 24 may be fabricated from any of a number of materials. For example, the table 22 may be fabricated from particle board or the product sold under the name Arboron, and the pod 24 may be fabricated from a plastic material, such as the product sold under the name Delrin.

Figure 3:
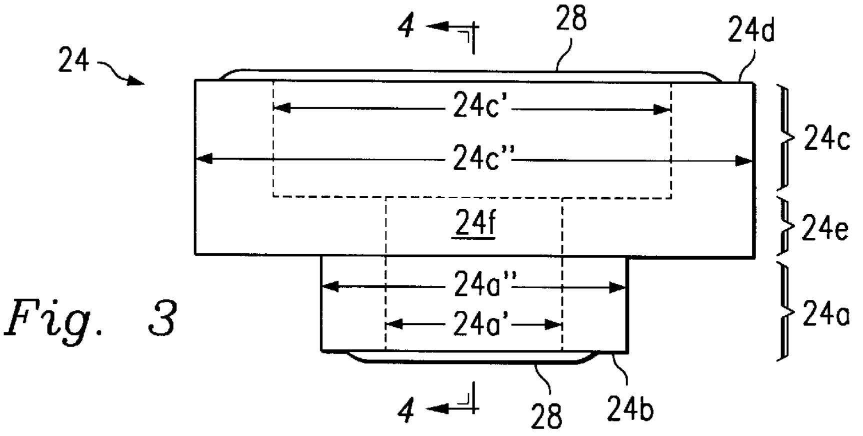
FIG. 3 is an elevational view of a vacuum pod of the system of FIG. 2.

As depicted in FIG. 3, the pod 24 includes a lower hollow cylindrical longitudinal portion 24*a* having an inside diameter (ID) 24*a*', an outside diameter (OD) 24*a*", and a lower open end 24*b*. The pod 24 further includes an upper hollow cylindrical longitudinal portion 24*c* having an ID 24*c*', an OD 24*c*", and an upper open end 24*d*. An intermediate portion 24*e* extends radially from the lower portion 24*a* to the upper portion 24*c*. Accordingly, the intermediate portion 24*e* is defined by the lower ID 24*a*' and the upper OD 24*c*". A passageway 24*f* thus extends from the lower end 24*b* to the upper end 24*d*.

Figure 4:
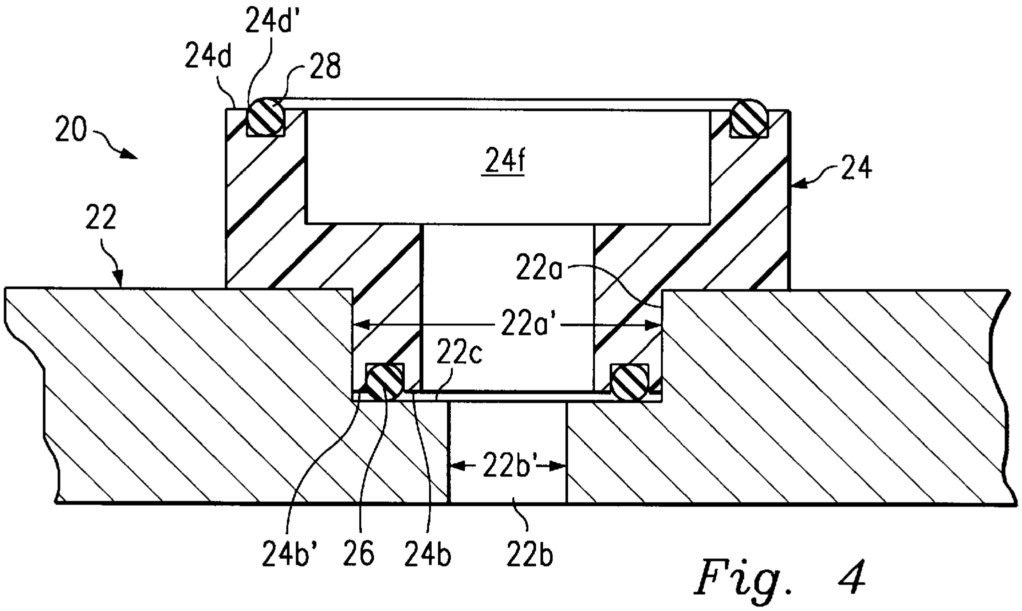
FIG. 4 is an elevational view, in cross section, of a vacuum pod of FIG. 2, taken along the line 4—4 of FIG. 3, installed in a work table shown partially broken-away.

As more clearly shown in FIG.4, an annular groove 24*b*' is formed in the lower end 24*b* of the pod 24 and an O-ring 26 is seated therein. Similarly, an annular groove 24*d*' is formed in the upper end 24*d* of the pod 24 and an O-ring 28 is seated therein. The O-rings 26 and 28 may be fabricated from any of a number of resilient materials, such as rubber, silicon, or the product sold under the name TEFLON.

As further shown in FIG. 4, the work table 22 has formed therein a cylindrical opening 22*a* having a diameter 22*a*' marginally larger than the pod lower portion OD 24*a*" (FIG. 3). At the lower end of the opening 22*a*, a hole 22*b* is formed having a diameter 22*b*' smaller than the diameter 22*a*'. As a consequence of the diameter 22*b*' being smaller than the diameter 22*a*', a shoulder portion 22*c* is formed which extends radially from the top of the hole 22*b* to the bottom of the opening 22*a*. It is understood that the lower end of the hole 22*b* communicates with a conventional vacuum source (not shown).

In operation, the lower portion 24*a* of the pod 24 is seated in the opening 22*a* until the lower end O-ring 26 rests on the shoulder 22*c*, thereby providing a pneumatic seal between the work table 22 and the pod 24. A flat surface of a workpiece (not shown) is placed for support on the upper end 24*d* of the pod 24. The upper end O-ring 28 provides a pneumatic seal between the pod 24 and the workpiece. It is understood that a plurality of such pods 24 may be placed in a plurality of corresponding openings 22*a* and the workpiece supported on the plurality of pods 24.

The vacuum source is then activated for generating a vacuum. The vacuum generated thereby is communicated through the hole 22*b* and the passageway 24*f* to create a suction force which acts on the workpiece surface area exposed to the passageway 24*f*. The suction force is equal approximately to the product of the workpiece surface area exposed to the passageway 24*f* and the atmospheric pressure acting on the workpiece. The workpiece is thus secured to the pod 24 and, accordingly, may be machined as desired. For example, the secured workpiece may be milled, routed, or drilled.

It is understood that the present invention can take many forms and embodiments. The embodiments described herein are intended to illustrate rather than to limit the invention, it being appreciated that variations may be made without departing from the spirit or the scope of the invention. For example, though the lower portion OD 24*a*" must be specifically sized to fit into the table opening 22*a*, the pod 24 may be fabricated having an upper portion 24*c* of virtually any ID 24*c*' and OD 24*c*". While the ID 24*c*' and OD 24*c*" are depicted in FIG. 3 as being larger than the ID 24*a*' and OD 24*a*", respectively, the ID 24*c*' and OD 24*c*" may be configured as equal to, or even smaller than, the ID 24*a*' and OD 24*a*", respectively. The upper portion 24*c* could also be non-cylindrical or even coupled with other such pod upper portions seated in other openings.

The present invention, as described herein, has many advantages over the prior art. For example, because the upper portion ID 24*c*' and OD 24*c*" of the pod 24 may be sized independently of the lower portion ID 24*a*' and OD 24*a*", there is no necessity for a ring 12*d* (FIG. 1) as there is in the prior art, thereby reducing the potential for failure inherent with such a ring. Furthermore, the pod upper portion 24*c* may be sized to accommodate a workpiece of virtually any size. Because the groove 12*d* (FIG. 1) also is not required, the work table 22 may be fabricated in approximately one-third the time required to fabricate the prior art table 12 configured for seating two sizes of pods. Because fabrication time is reduced, cost savings are also realized. A further advantage is that the system 20 is compatible with the prior art system 10 (FIG. 1). For example, the pod 24 may be seated into the opening 12*a* of an existing prior art table 12. Conversely, a relatively small prior art pod 12 may be fitted into the opening 22*a*.

Figure 5:
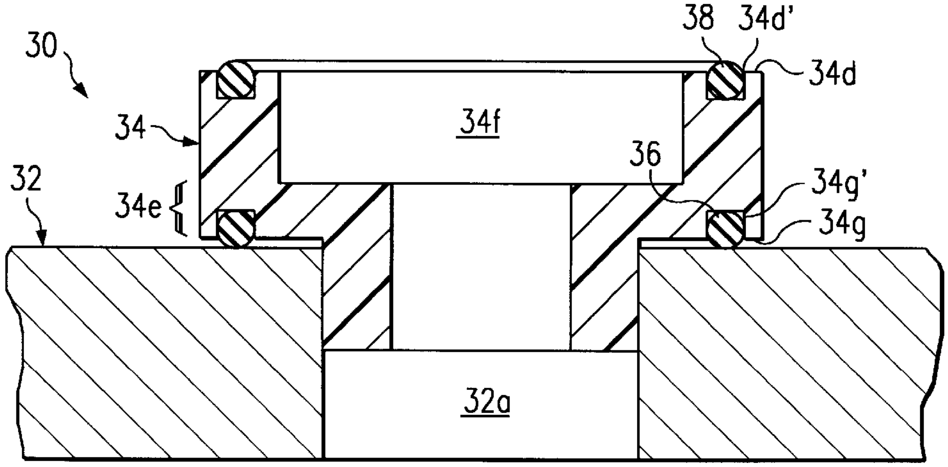
FIG. 5 is an elevational view, in cross section, of a vacuum pod support system of an alternate embodiment of the present invention.

FIG. 5 depicts the details of a vacuum pod support system 30 according to an alternate embodiment of the present invention. Since many aspects of the alternate embodiment are similar to corresponding aspects of the preceding embodiment, these aspects will not be described in further detail.

According to the embodiment of FIG. 5, the system 30 comprises a work table 32 and a vacuum pod 34 seated in an opening formed in the table 32. Unlike the pod 24 (FIG. 4), however, the pod 34 does not include a groove corresponding to the groove 24*b*' formed in the lower end 24*b* thereof. The pod 34 does, however, include an annular groove 34*g*' formed in a lower side 34*g* of an intermediate portion 34*e* of the pod 34 and an O-ring 36 is seated therein. It is understood that, if necessary, the intermediate portion 34*e* of the pod 34 may be extended outwardly to accommodate the groove 34*g*. Like the pod 24, the pod 34 includes an O-ring 38 disposed in a groove 34*d*' formed in an upper end 34*d* of the pod 34.

As further shown in FIG. 5, the work table 32 has formed therein a single, constant-diameter, cylindrical opening 32*a* which extends through the work table 32 and communicates with a conventional vacuum source (not shown).

Operation of the support system 30 is similar to that of the system 20 described above with respect to the preceding embodiment, except that the seal between the table 32 and the pod 34 is established by the O-ring 36 seated in the annular groove 34*g*'.

In addition to the advantages provided by the preceding embodiment described above, the alternate embodiment of the present invention provides for a number of further advantages. For example, the alternate embodiment provides for a simpler work table design. Because the opening 32*a* is of a constant diameter and extends through the table 32, it may be readily drilled without tracking the exact depth to which a drilling operation has progressed. Furthermore, fabrication tolerances may be greatly relaxed because there is no requirement that the pod lower portion 34*a* be precisely sized to rest on a shoulder in the opening 32*a*. Additionally, because the O-rings 36 and 38 may be sized identically, the pod 34 may be fabricated from O-rings of the same size, thereby simplifying stocking requirements. Moreover, the O-rings 36 and 38 of the alternate embodiment may be vertically aligned so that the pod 34 experiences no bending moment and, hence, less stress and vulnerability to failure. By eliminating such bending moments, the pod 34 may be fabricated using less material, thereby further saving costs.

Although illustrative embodiments of the invention have been shown and described, a wide range of modification, change and substitution is intended in the foregoing disclosure and in some instances some features of the present invention may be employed without a corresponding use of the other features. Accordingly, it is appropriate that the appended claims be construed broadly and in a manner consistent with the scope of the invention.

What is claimed is:

1. A system for supporting a workpiece on a work table, said table having a shouldered opening defined therein for communication with a vacuum source, said system comprising a pod having:

a first cylindrical wall having a first outside diameter, sized to seat in said opening, and first and second opposed ends;

a second cylindrical wall having a second outside diameter unequal to said first outside diameter, said second wall further having first and second ends, and a groove formed in the second end of said second wall for receiving a seal;

an intermediate portion extending radially from said second end of said first wall to said first end of said second wall, so that a passageway extends through the pod from said first end of said first wall to said second end of said second wall for providing fluid communication therethrough; said second wall and said intermediate portion being seated entirely on a surface of said work table; and a seal seated in said groove for supporting said workpiece so that a vacuum communicated from said vacuum source to said opening creates a suction force which secures said workpiece on said pod.

2. The system of claim 1 wherein said pod further includes:

a groove formed in said first end of said first wall; and a seal seated in said groove formed in said first end of said first wall for providing a seal between said pod and work table.

3. The system of claim 2 wherein said first and second seals are O-rings.

4. A system for supporting a workpiece on a work table, said table having a shouldered opening defined therein for communication with a vacuum source, said system comprising a pod having:

a first cylindrical wall having a first outside diameter, sized to seat in said opening and first and second opposed ends;

a second cylindrical wall having a second outside diameter unequal to said first outside diameter, said second wall further having first and second ends, and a groove formed in the second end of said second wall for receiving a seal;

an intermediate portion extending radially from said second end of said first wall to said first end of said second wall, so that a passageway extends through the pod from said first end of said first wall to said second end of said second wall for providing fluid communication therethrough;

a seal seated in said groove for supporting said workpiece so that a vacuum communicated from said vacuum source to said opening creates a suction force which secures said workpiece on said pod;

a groove formed in the intermediate portion for receiving a seal; and a seal seated in said groove formed in the intermediate portion for providing a seal between the pod and said work table.

5. The system of claim 4 wherein said first and second seals are O-rings.

6. The system of claim 4 wherein said second outside diameter is greater than said first outside diameter and extends radially beyond said opening.

7. A system for supporting a workpiece, said system comprising:

a table having an opening formed therein, said opening being adaptable for communication with a vacuum source, said opening having a shoulder; and a pod comprising:

a first cylindrical wall having a first outside diameter sized to seat in said opening on said shoulder, and first and second opposed ends;

a second cylindrical wall having a second outside diameter unequal to said first outside diameter, said second wall further having first and second ends, and a groove formed in the second end of said second wall for receiving a seal;

an intermediate portion extending radially from said second end of said first wall to said first end of said second wall, so that a passageway extends through the pod from said first end of said first wall to said second end of said second wall for providing fluid communication therethrough, said second wall and said intermediate portion being seated entirely on a surface of said work table; and a seal seated in said groove for supporting said workpiece so that a vacuum may be communicated through said passageway to create a suction force which acts on said workpiece to secure said workpiece on said pod.

8. The system of claim 7 wherein said pod further includes:

a groove formed in said first end of said first wall; and a seal seated in said groove formed in said first end of said first wall for providing a seal between said pod and work table.

9. The system of claim 8 wherein said first and second seals are O-rings.

10. A system for supporting a workpiece, said system comprising:

a table having an opening formed therein, said opening being adaptable for communication with a vacuum source, said opening having a shoulder; and a pod comprising:

a first cylindrical wall having a first outside diameter sized to seat in said opening on said shoulder, and first and second opposing ends;

a second cylindrical wall having a second outside diameter unequal to said first outside diameter, said second wall further having first and second ends, and a groove formed in the second end of said second wall for receiving a seal;

an intermediate portion extending radially from said second end of said first wall to said first end of said second wall, so that a passageway extends through the pod from said first end of said first wall to said second end of said second wall for providing fluid communication therethrough;

a first seal seated in said groove in said second end for supporting said workpiece so that a vacuum may be communicated through said passageway to create a suction force which acts on said workpiece to secure said workpiece on said pod;

a groove formed in the intermediate portion for receiving a seal; and a second seal seated in said groove formed in the intermediate portion for providing a seal between said pod and said work table.

11. The system of claim 10 wherein said first and second seals are O-rings.

12. The system of claim 10 wherein said second outside diameter is greater than said first outside diameter and extends radially beyond said opening.

13. A system for supporting a workpiece on a work table, said table having an opening defined therein for communication with a vacuum source, said system comprising a pod having:

a first cylindrical wall having a first outside diameter, sized to seat in said opening, and first and second opposed ends;

a second cylindrical wall having a second outside diameter greater than said first outside diameter and greater than the inside diameter of said opening, said second wall further having first and second ends, and a groove formed in the second end of said second wall for receiving a seal;

an intermediate portion extending radially from said second end of said first wall to said first end of said second wall, so that a passageway extends through the pod from said first end of said first wall to said second end of said second wall for providing fluid communication therethrough, said second wall and said intermediate portion being seated entirely on a surface of said work table; and a seal seated in said groove in said second end for supporting said workpiece so that a vacuum from said vacuum source creates a suction force which acts on said workpiece to secure said workpiece on said pod.

14. The system of claim 13 wherein said pod further includes:

a groove formed in the intermediate portion for receiving a seal; and a seal seated in said groove formed in the intermediate portion for providing a seal between said pod and said work table.

15. The system of claim 14 wherein said seals are O-rings.

16. The system of claim 13 wherein said intermediate portion extends radially beyond said first wall.

17. The system of claim 13 wherein said opening extends through said table and is defined by a constant diameter.

* * * * *